April 6, 1965
G. POTAPENKO ETAL
3,176,887
PRESSURIZED DISPENSER
Filed Aug. 14, 1961
2 Sheets-Sheet 1
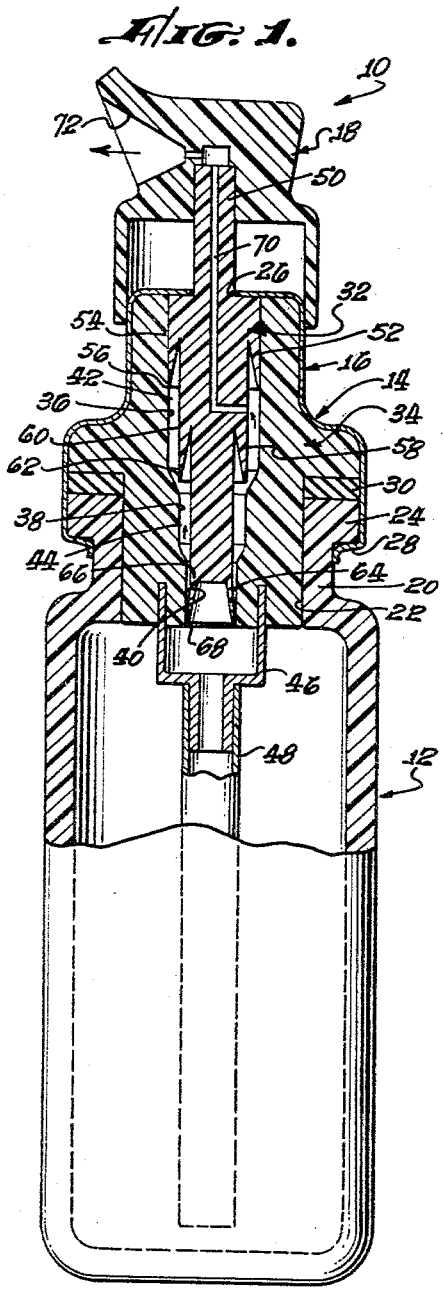
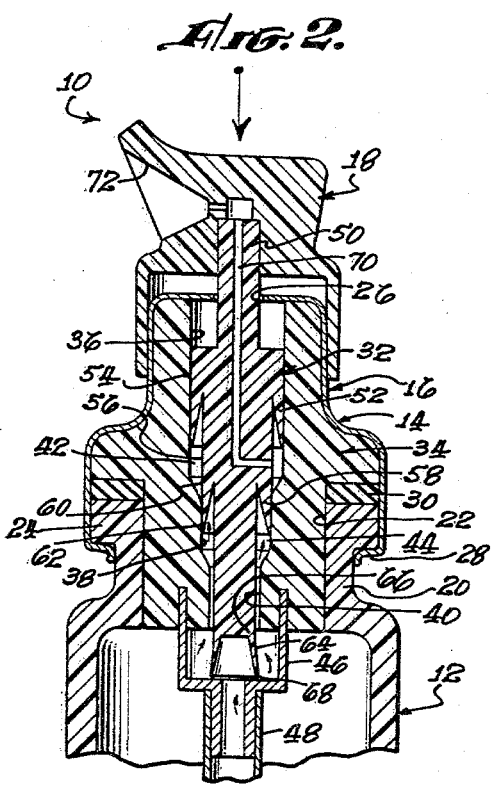
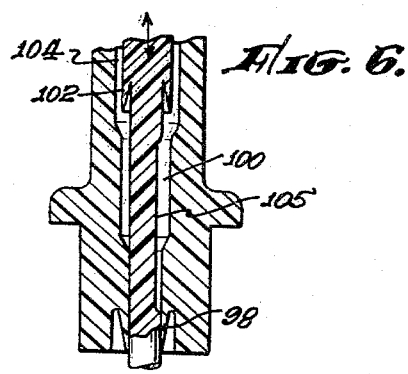
GENNADY POTAPENKO,
JOHN K. LYON,
INVENTORS.
BY THEIR ATTORNEYS.
HARRIS, KIECH, RUSSELL & KERN.

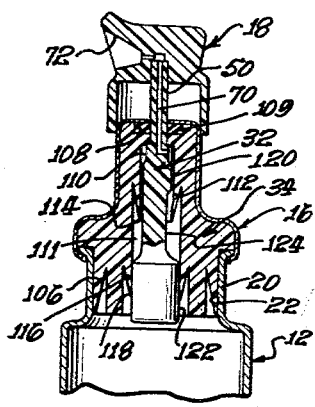
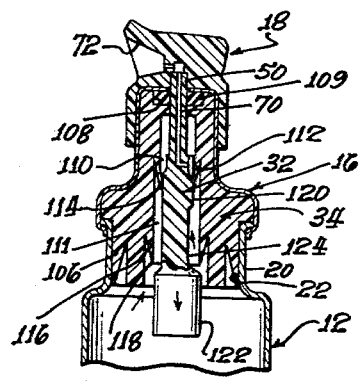
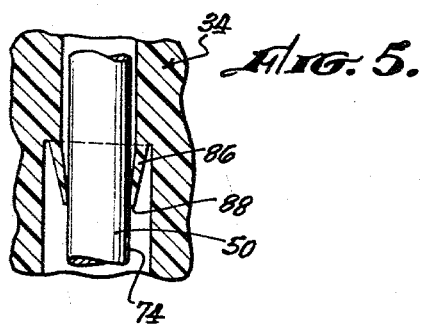
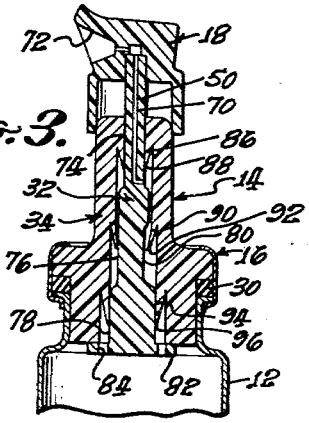
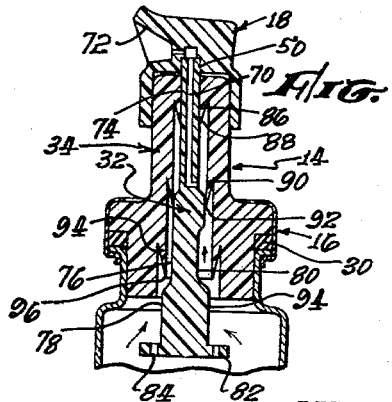

United States Patent Office 3,176,887
Patented Apr. 6, 1965

3,176,887
PRESSURIZED DISPENSER
Gennady Potapenko, 1718 Oakdale St., and John K. Lyon, 1176 Afton, both of Pasadena, Calif.
Filed Aug. 14, 1961, Ser. No. 131,395
12 Claims. (Cl. 222—394)

The present invention relates generally to the container art and more particularly to a novel pressurized dispenser for discharging measured amounts of pressurized fluid material, preferably in spray form.

Briefly stated, the present invention includes a valve assembly mounted in the neck portion of a pressurized container, said assembly including a housing member and a stem member. A passageway providing a transfer chamber and a measuring chamber extends through the housing member for communication with the interior of the container. A plurality of vertically spaced annular flanges or cup-like elements and co-operating cylindrical wall surfaces are provided in the passageway, whereby when the stem member is actuated, fluid under pressure is first admitted to the measuring chamber and a measured amount of fluid is then channeled through the transfer chamber and dispensed from a discharge port contained in an actuating cap. The cup-like elements can be provided on the stem member or on the housing member, or distributed between the two members, and both the stem member and the housing member are preferably of unitary construction and molded from plastic material.

As is well known in the art, there are many types and styles of pressurized dispensers or containers in use at the present time. However, for the most part the known constructions are relatively expensive and contain numerous parts which require extensive machining and the maintaining of close tolerances.

It is an object of the present invention, therefore, to provide a novel pressurized dispenser which is extremely simple in construction and relatively inexpensive to manufacture. More particularly, it is an object to provide such a dispenser which consists essentially of a container and a simple two-part valve assembly.

Another object is to provide a dispenser which contains a relatively simple and inexpensive valve for dispensing measured amounts of fluid material. More particularly, it is an object to provide such a valve which consists essentially of two parts which function both as a valve and as a measuring means. Specifically, it is an object to provide a simple valve which also functions as a measuring means, and which can be molded from conventional plastic materials.

Yet another object is to provide a valve construction whereby the container can be pressurized by connecting the discharge side of the valve to a source of pressurized gas.

Further objects and advantages of the present invention will be apparent from the following detailed description, reference being had to the accompanying drawings wherein preferred embodiments of the present invention are shown.

In the drawings:

FIG. 1 is a vertical sectional view of a pressurized dispenser constructed in accordance with the teachings of the present invention, showing the valve in the closed position relative to the interior of the containers after a measured amount of fluid material has been discharged from the device;

FIG. 2 is a fragmentary vertical sectional view of the upper portion of the dispenser shown in FIG. 1, showing the valve in the open position in communication with the interior of the container to receive a predetermined amount of fluid material;

FIG. 3 is a fragmentary vertical sectional view, on a reduced scale, of a modified valve construction, showing the valve in the closed position;

FIG. 4 is a fragmentary vertical sectional view similar to FIG. 3 showing the same valve in the open position in communication with the interior of the container;

FIG. 5 is an enlarged fragmentary vertical sectional view of the upper portion of the valve housing member shown in FIGS. 3 and 4 illustrating the details of one of the cup-like sealing elements;

FIG. 6 is a fragmentary vertical sectional view on a slightly reduced scale of a hybrid valve construction, showing the valve in the closed position, as in FIG. 1;

FIG. 7 is a fragmentary vertical sectional view, also on a reduced scale, of yet another modified valve construction showing the valve in the closed position; and FIG. 8 is a fragmentary vertical sectional view similar to FIG. 7 showing the same valve in the open position, i.e., in the position to receive a predetermined amount of fluid from the container.

Referring to the drawings more particularly by reference numerals, specifically FIGS. 1 and 2, 10 indicates generally a pressurized dispenser embodying the teachings of the present invention, which includes a container 12, a valve assembly 14, a tubular connector 16 fastening the valve assembly to the container, and an actuating cap 18 at the upper end of the device.

The container 12 is of conventional construction and preferably molded of plastic material, and includes a neck portion 20 with an inner wall surface 22 and an upper lip 24.

The tubular connector 16 which may be made of metal fastens the valve assembly to the container and includes an aperture 26 at the upper end thereof, and a flange 28 at the lower end which engages the lip 24 of the container. A resilient washer 30 may be interposed between the container and the valve assembly for sealing purposes.

The valve assembly 14 includes a valve stem member 32 and a valve housing member 34, each of said members being preferably of unitary construction and molded from plastic material. The valve housing member contains a vertically extending passageway adapted to communicate with the interior of the container and includes an upper inner wall surface 36, an intermediate wall surface 38 and a lower wall surface 40, the diameters of the chambers defined by said wall surfaces decreasing progressively from the upper one to the lower one. In operation, the upper wall surface defines a transfer chamber 42 and the intermediate wall surface defines a measuring or metering chamber 44.

Depending from the lower or inner end of the valve housing member 34 is a dip tube assembly which includes a tubular connector 46 and a tube 48 which extends downwardly to adjacent the bottom of the container 12.

Turning to a consideration of the valve stem member, it includes a stem portion 50 which projects through the aperture 26 and into the cap 18, an upper annular flange or cup-like element 52 which has a base 54 and a lip portion 56, a similarly shaped intermediate cup-like element 58 with a base 60 and a lip portion 62, and a lower cup-like element 64 with a base 66 and a lip portion 68. A discharge passageway 70 is provided in the valve stem member and extends from the vicinity of the transfer chamber 42 to the cap 18 where it communicates with a discharge port 72. The diameter at the base 54 of the upper cup-like element is slightly less than the diameter of the transfer chamber 42, and the diameter at the lip portion 56 thereof is slightly greater than the diameter of the transfer chamber when the cup-like element is unrestrained. Thus, said cup-like element 52 flares downwardly and outwardly so that when it is positioned in the upper or transfer chamber 42, the lip portion 56 thereof is in sliding sealing engagement with the inner wall surface 36. The intermediate cup-like element 58 is of similar construction and has the same size relationship to the transfer chamber 44 and intermediate wall surface 38, and the same relationship exists between the lower cup-like element 64 and the lower wall surface 40.

In the embodiment shown in FIGS. 1 and 2, the plastic material used in producing the stem member 32 is preferably softer than the plastic material used for the housing member 34, whereby the intermediate and lower cup-like elements flex as they contact their respective wall surfaces in sealing engagement.

Considering the operation of the pressurized dispenser shown in FIGS. 1 and 2, when the valve is in the closed position (FIG. 1) fluid under pressure is contained in the tubular connector 46 and in the interior of the lower cup-like sealing element so as to maintain the lip portion 68 thereof in sealing engagement with the wall surface 40. When the cap 18 is moved downwardly to shift the valve stem member 32 to the open position (FIG. 2), fluid under pressure passes upwardly through the dip tube 48 into the tubular connector 46 and passes around the lower cup-like element and into the measuring chamber 44 defined by the lower wall surface 38 and the intermediate cup-like element. Here again, the pressure of the fluid bearing against the inner surfaces of the intermediate cup-like element holds the lip portion 62 thereof in sealing engagement with the wall surface 38. When the cap 18 is released and the valve stem member 32 moves upwardly due to the fluid pressure in the container acting against the lower surfaces of the valve stem member 32, the lip portion 68 of the lower cup-like element will reengage the wall surface 40, thereby trapping a measured amount of fluid in the measuring chamber 44. As the valve stem member 32 continues to move upwardly, the lower cup-like element remains in sealing engagement with the lower wall surface 40, and, when the lip portion 62 of the intermediate cup-like element clears the upper end of the intermediate wall surface 38, the fluid trapped within the measuring chamber flows into the transfer chamber 56, into the discharge passageway 70, and out through the discharge port 72 in the cap 18. It will be noted that the upper cup-like element remains in sliding sealing engagement with the upper wall surface 36 so as to prevent the escape of fluid upwardly around the upper end of the valve stem member 32. Also, the resilient washer 30 prevents leakage of the fluid from between the valve housing member 34 and the neck portion 20 of the container.

The pressurizing or charging of the container can be accomplished by connecting the upper part of the discharge passageway 70 to a source of pressurized gas. This can be done when the valve is either in its closed or open position because the cup-like elements 58 and 64 will flex inwardly and away from their co-operating wall surfaces when the flow of fluid material is in the downward direction at an increased pressure.

The modified construction shown in FIGS. 3 and 4 is somewhat similar to the construction previously described in that it also employs a series of three annular flange or cup-like elements for valve and sealing purposes. However, it differs from the construction shown in FIGS. 1 and 2 in that in the latter the cup-like elements are contained on the valve stem member, whereas in the construction which will now be described the cup-like elements are formed on the valve housing member. Consequently, in this embodiment, the material used for the valve housing member is preferably softer than the material used for the valve stem member.

The construction shown in FIGS. 3 and 4 includes a container 12, a tubular connector 16, a sealing washer 30, a valve assembly 14, and a cap or actuator 18. The valve assembly also includes a valve stem member 32 and a valve housing member 34, each of which is preferably of unitary construction and molded from plastic material, as previously mentioned. The valve stem member also includes a stem portion 50 which contains a discharge passageway 70 in communication with the discharge port 72 contained in the cap 18. The stem portion 50 also provides an upper cylindrical wall surface 74, and below it an intermediate cylindrical wall surface 76 which merges into a lower cylindrical wall surface 78, each of said wall surfaces being of a greater diameter than the one immediately above it. However, the wall surface 76 is cut away or flattened on one side as at 80 to provide communication between two of the chambers as will be described more fully hereinafter. A disc-like stop member 82 containing spaced apertures 84 is provided at the lower end of the valve stem member 32.

Turning to a consideration of the modified valve housing member, it includes an upper annular flange or cup-like element 86 with a lip portion 88, an intermediate cup-like element 90 with a lip portion 92, and a lower cup-like element 94 with a lip portion 96. Each of these cup-like elements is similar in construction to the cup-like elements previously described in that the lip portion thereof extends inwardly (or outwardly) so as to engage the wall surface adjacent thereto in sealing relationship. This construction is clearly shown in FIG. 5 which is an enlarged fragmentary view adjacent the upper cup-like element 86 shown in FIG. 3 and 4 and which shows the lip portion 88 extending inwardly into sliding sealing engagement with the upper wall surface 74 of the valve stem member.

When the valve is in the closed postion (FIG. 3), the fluid in the container 12 is prevented from flowing upwardly through the passage containing the valve stem member by the lower cup-like element 94 which is in sealing engagement with the lower wall surface 78. It will be noted that the pressurized fluid, passing upwardly through the apertures 84 acts against the outer surfaces of the lower cup-like element 94 so as to increase its sealing engagement with the lower wall surface 78.

When the cap 18 is depressed so as to move the valve stem member 32 to the open position (FIG. 4) the pressurized fluid flows upwardly around the lower wall surface 78, through the lower cup-like element 94 and into a measuring or metering chamber, the upper end of which is defined by the intermediate cup-like element 90 which has its lip portion 92 in sealing engagement with the intermediate wall surface 76. When the cap 18 is released and the valve stem member 32 moves upwardly, the lip portion 96 of the lower cup-like element will engage the lower wall surface 78 in sealing engagement before the lip portion 92 of the intermediate cup-like element reaches the flattened portion 80, whereby a measured amount of fluid is trapped in the measuring chamber between the intermediate and the lower cup-like elements. As the valve stem member 32 continues to move upwardly, the flattened portion 80 will pass under the lip portion 92 of the intermediate cup-like element, thereby permitting the fluid to flow past the intermediate cup-like element, through the passageway 70, and out through the discharge port 72.

In this construction the upper cup-like element 86 prevents the escape of fluid from the upper or transfer chamber around the stem portion 50, and the resilient washer 30 prevents the escape of fluid from between the neck of the container and the valve housing member.

The modified valve construction shown in FIG. 6 is a hybrid construction in that it embodies portions of both of the constructions shown in FIGS. 1 and 2 and in FIGS. 3 and 4. Thus, at least one annular flange or cup-like element is provided on both the valve stem member and the valve housing member. In this further modified construction a lower cup-like sealing element 98 is provided on the valve housing member to function as the valve proper and to control the flow of fluid into a metering or measuring chamber 100, and an intermediate cup-like element 102 is provided on the valve stem member to control the flow of fluid into a transfer chamber 104. Obviously, these cup-like elements could be reversed with the lower one contained on the valve stem member and the intermediate one contained on the valve housing member. Also, it should be apparent from the previous description that the upper cup-like element (not shown) could be formed on either the housing member as in FIG. 3, or on the stem member as in FIG. 1. This construction includes a flattened portion 105 on the valve stem member whereby the device functions in substantially the same manner as the construction shown in FIGS. 3 and 4.

Yet another modified construction is shown in FIGS. 7 and 8 wherein the cup-like sealing elements are formed on the valve housing member, as in FIGS. 3 and 4, but the upper cup-like element is replaced with a sealing washer. In addition, the sealing washer previously used between the container and valve assembly is replaced with an outer annular flange or skirt element. This construction includes a valve housing member 34 fastened to the neck portion 20 of a container 12 by means of a tubular connector 16, and a valve stem member 32 with an upper stem portion 50 which receives a cap or actuator 18 at the upper end thereof, the actuator being provided with an outlet port 72.

The inner or bottom end of the valve housing member 34 is provided with an outer depending annular flange or skirt 106 which extends outwardly into sealing engagement with the wall surface 22 of the neck portion 20. The upper or outer end of said valve housing member is provided with an annular recess 108 which contains a sealing washer 109 which receives the stem portion 50 in sliding sealing engagement.

A valve stem receiving passageway with an upper transfer chamber 110 and a lower measuring chamber 111 extends through the valve housing member and is adapted to communicate with the interior of the container. This passageway includes an upper annular flange or cup-like sealing element 112 which extends downwardly and inwardly and terminates in a lip portion 114. A similar lower cup-like sealing element 116 with a lip portion 118 is provided at the lower or inner end of said passageway. The valve stem member 32 includes an upper wall surface 120 and a lower wall surface 122 of increased diameter, one side of the wall surface 120 being cut away or flattened as at 124 for a purpose to appear. The upper wall surface 120 has a diameter which is less than the diameter of the upper transfer chamber 110 and greater than the diameter at the lip portion 114, whereby the latter is in sliding sealing engagement with said upper wall surface 120, i.e. except when it registers with the flattened area 124. In like manner, the diameter of the lower wall surface 122 is less than the diameter of the lower or measuring chamber 111 and greater than the diameter at the lip portion 118.

Thus, when the valve stem member 32 is in the closed position (FIG. 7) the engagement of the lip portion 118 of the lower cup-like element with the lower wall surface 122 prevents the passage of fluid from the container 12. Also, as previously mentioned with respect to the other constructions, the force of the fluid acting against the outer surfaces of the lower cup-like element increases the sealing effect of it. When the valve stem member 32 is moved downwardly to the open position (FIG. 8) pressurized fluid passes upwardly around the lower wall surface 122, through the lower cup-like element 116 and into the measuring or metering chamber 111, the upper end of which is defined by the upper cup-like element 112. When the cap 18 is released and the valve stem member 32 moves upwardly, the upper portion of the lower wall surface 122 will reengage the lip portion 118 of the lower cup-like element 116 before the flattened area 124 passes the lip portion 114, whereby a measured amount of fluid is trapped between the upper and lower cup-like elements. As the valve stem member 32 continues to move upwardly, the flattened portion 124 passes under the lip portion 114 whereby the fluid in the metering chamber 111 passes around the upper wall surface 120 into the transfer chamber 110, through the discharge passageway 170, and out through the discharge port 72.

It will be readily appreciated from the foregoing description that all of the various modifications described herein are similar in the sense that they employ two or more vertically spaced annular flanges or cup-like elements for dividing a passageway into a transfer chamber and a metering or measuring chamber, whereby measured amounts of pressurized fluid material can be discharged from the container. The cup-like sealing elements can be provided on the stem member or on the housing member, or they can be provided on both members. Each of said members is preferably of unitary construction and molded from plastic material. A similar type of cup-like element can be used for sealing the housing member to the container, and for sealing the upper portion of the stem member in the housing member, or annular resilient washers can be used for these purposes.

Thus, it is apparent that there has been provided a novel pressurized dispenser which fulfills all of the objects and advantages sought therefor.

It is to be understood that the foregoing description and the accompanying drawings have been given only by way of illustration and example and that changes and alterations in the present disclosure which will be readily apparent to one skilled in the art are contemplated as within the scope of the present invention.

We claim:

1. A pressurized dispenser, comprising: a container having a neck portion; a valve assembly fastened to said neck portion, said assembly including a housing member containing a passageway adapted to communicate with the interior of the container and providing an upper transfer chamber and a lower measuring chamber; a stem member mounted in said passageway for axial movement relative thereto between an open position and a closed position and including means providing communication between the exterior of the dispenser and the transfer chamber; and a plurality of vertically spaced sets of cup-like sealing elements and co-operating wall surfaces on said stem member and housing member in the passageway, said sets providing a seal between the interior of the container and the measuring chamber and providing communication between the measuring chamber and the transfer chamber when the stem member is in the closed position, and providing a seal between the measuring chamber and the transfer chamber and providing communication between the measuring chamber and the interior of the container when the stem member is in the open position.

2. A pressurized dispenser, comprising: a container having a neck portion; a valve assembly fastened to said neck portion, said assembly including a housing member containing a passageway adapted to communicate with the interior of the container and providing an upper transfer chamber and a lower measuring chamber; a stem member mounted in said passageway for axial movement relative thereto between an open position and a closed position and including means providing communication between the exterior of the dispenser and the transfer chamber; and upper and lower sets of cup-like sealing elements and co-operating wall surfaces on said stem member and housing member in the passageway, said lower set providing a seal between the interior of the container and the measuring chamber and the upper set providing communication between the measuring chamber and the transfer chamber when the stem member is in the closed position, the lower set providing communication between the container and the measuring chamber and the upper set providing a seal between the measuring chamber and the transfer chamber when the stem member is in the open position.

3. A pressurized dispenser, comprising: a container having a neck portion; a valve assembly fastened to said neck portion, said assembly including a housing member containing a passageway adapted to communicate with the interior of the container and providing an upper transfer chamber and a lower measuring chamber; a stem member mounted in said passageway for axial movement relative thereto between an open position and a closed position and containing means providing communication between the exterior of the dispenser and the transfer chamber; and upper and lower sets of cup-like sealing elements and co-operating wall surfaces on said stem member and housing member in the passageway, the wall surface and the cup-like element of the lower set being in sealing engagement and the wall surface and the cup-like element of the upper set being in axial spaced relationship to provide communication between the measuring chamber and the transfer chamber when the stem member is in the closed position, the wall surface and the cup-like element of the upper set being in sealing engagement and the wall surface and the cup-like element of the lower set being in axial spaced relationship to provide communication between the container and the measuring chamber when the stem member is in the open position.

4. A pressurized dispenser, comprising: a container having a neck portion; a valve assembly fastened to said neck portion, said assembly including a housing member containing a passageway adapted to communicate with the interior of the container, the passageway having an upper wall surface defining in part an upper transfer chamber, an intermediate wall surface defining in part a measuring chamber, and a lower wall surface providing a valve seat; a valve stem member positioned in said passageway for axial movement between an open position and a closed position, said stem member containing an upper cup-like member with a lip portion adapted to engage the intermediate wall surface in sealing relationship, and a lower cup-like element with a lip portion adapted to engage the lower wall surface in sealing engagement, the lower cup-like element being in sealing engagement with the lower wall surface and the upper cup-like element being spaced axially from the intermediate wall surface to provide communication between the measuring chamber and the transfer chamber when the stem member is in the closed position, the lower cup-like member being spaced axially from the lower wall surface to provide communication between the container and the measuring chamber and the upper cup-like element being in sealing engagement with the intermediate wall surface when the stem member is in the open position; and passage means between the exterior of the container and the transfer chamber.

5. A pressurized dispenser, comprising: a container having a neck portion; a valve assembly fastened to said neck portion, said assembly including a housing member containing a passageway adapted to communicate with the interior of the container, the passageway having an upper wall surface defining in part an upper transfer chamber, an intermediate wall surface defining in part a measuring chamber, and a lower wall surface providing a valve seat; a valve stem member positioned in said passageway for axial movement between an open position and a closed position, said stem member containing an upper cup-like member with a lip portion in sliding sealing engagement with the upper wall surface, an intermediate cup-like element with a lip portion adapted to engage the intermediate wall surface in sealing engagement, and a lower cup-like element with a lip portion adapted to engage the lower wall surface in sealing engagement, the lower cup-like element being in sealing engagement with the lower wall surface and the intermediate cup-like element being spaced axially from the intermediate wall surface to provide communication between the measuring chamber and the transfer chamber when the stem member is in the closed position, the lower cup-like element being spaced axially from the lower wall surface to provide communication between the interior of the container and the measuring chamber and the intermediate cup-like element being in sealing engagement with the intermediate wall surface when the stem member is in the closed position; and passage means between the exterior of the container and the transfer chamber.

6. A pressurized dispenser, comprising: a container having a neck portion; a valve assembly fastened to said neck portion, said assembly including a housing member containing a passageway adapted to communicate with the interior of the container and providing an upper transfer chamber and a lower measuring chamber; a stem member mounted in said passageway for axial movement relative thereto between an open position and a closed position and including means providing communication between the exterior of the dispenser and the transfer chamber; and a plurality of vertically spaced sets of imperforate annular sealing elements and co-operating wall surfaces on said stem member and housing member in the passageway, said sets providing a seal between the interior of the container and the measuring chamber and providing communication between the measuring chamber and the transfer chamber when the stem member is in the closed position, and providing a seal between the measuring chamber and the transfer chamber and providing communication between the measuring chamber and the interior of the container when the stem member is in the open position.

7. A pressurized dispenser, comprising: a container having a neck portion; a valve assembly fastened to said neck portion, said assembly including a housing member containing a passageway adapted to communicate with the interior of the container and providing an upper transfer chamber and a lower measuring chamber; a stem member mounted in said passageway for axial movement relative thereto between an open position and a closed position and including means providing communication between the exterior of the dispenser and the transfer chamber; and upper and lower sets of imperforate annular sealing elements and co-operating wall surfaces on said stem member and housing member in the passageway, said lower set providing a seal between the interior of the container and the measuring chamber and the upper set providing communication between the measuring chamber and the transfer chamber when the stem member is in the closed position, the lower set providing communication between the container and the measuring chamber and the upper set providing a seal between the measuring chamber and the transfer chamber when the stem member is in the open position.

8. A pressurized dispenser, comprising: a container having a neck portion; a valve assembly fastened to said neck portion, said assembly including a housing member containing a passageway adapted to communicate with the interior of the container and providing an upper transfer chamber and a lower measuring chamber; a stem member mounted in said passageway for axial movement relative thereto between an open position and a closed position and containing means providing communication between the exterior of the dispenser and the transfer chamber; and upper and lower sets of imperforate annular sealing elements and co-operating wall surfaces on said stem member and housing member in the passageway, the wall surface and the annular element of the lower set being in sealing engagement and the wall surface and the annular element of the upper set being in axial spaced relationship to provide communication between the measuring chamber and the transfer chamber when the stem member is in the closed position, the wall surface and the annular element of the upper set being in sealing engagement and the wall surface and the annular element of the lower set being in axial spaced relationship to provide communication between the container and the measuring chamber when the stem member is in the open position.

9. A pressurized dispenser including: a container having a neck portion; a valve assembly fastened to said neck portion, said assembly including a housing member containing a passageway having at least two shoulders and being in communication with said container, the area between a first of said shoulders and a second of said shoulders defining in part a measuring chamber, and an upper wall surface above said second shoulder defining in part a transfer chamber; a valve stem member slidably mounted in said passageway between an open position and a closed position and including passage means providing communication between the exterior of the dispenser and the transfer chamber; and an upper, an intermediate and a lower set of annular sealing elements and cooperating wall surfaces on said stem member and said passageway, said sets providing a seal between the interior of the container and the measuring chamber and providing communication between the measuring chamber and the transfer chamber when the stem member is in the closed position, and providing a seal between the measuring chamber and the transfer chamber and providing communication between the measuring chamber and the interior of the container when the stem member is in the open position.

10. A pressurized dispenser comprising: a container having a neck portion; a valve assembly fastened to said neck portion, said assembly including a housing member containing a passageway having at least two shoulders and being in communication with said container, said passageway having a lower wall surface between said container and a first of said shoulders providing a valve seat; an intermediate wall surface between said first shoulder and a second of said shoulders defining in part a measuring chamber, and an upper wall surface above said second shoulder defining in part an upper transfer chamber; a valve stem member slidably mounted in said passageway between an open position and a closed position, said stem member having an upper, an intermediate and a lower cup-like member, said lower cup-like member sealingly engaging said lower wall surface and said intermediate cup-like member being spaced axially from the intermediate wall surface to provide communication between the measuring chamber and the transfer chamber when the stem member is in the closed position the lower cup-like member being spaced axially from the lower wall surface to provide communication between the container and the measuring chamber and the intermediate cup-like member sealingly engaging the intermediate wall surface when the stem member is in the open position; said upper cup-like member being in sealing engagement with said upper wall surface when said stem member is in either the open or the closed position; and passage means between the exterior of the container and the transfer chamber.

11. A pressurized dispenser, including: a container having a neck portion; a valve assembly fastened to said neck portion and including a housing member having a longitudinal passageway therethrough, said passageway having three different stepped diameters, a large diameter, an intermediate diameter, and a small diameter; an axially movable valve stem member in said passageway, having three different stepped diameters, a large diameter, an intermediate diameter, and a small diameter, said valve stem member having passage means therein communicating between its said intermediate diameter and the exterior of the container; a first annular, downwardly directed, cup-shaped sealing element on one of said members to form a first fluid seal between said large diameters; a second annular, downwardly directed, cup-shaped sealing element on said one of said members to form a second fluid seal between said intermediate diameters; and a third annular, downwardly directed, cup-shaped sealing element on said one of said members to form a third fluid seal between said small diameters.

12. A pressurized dispenser, including: a container having a neck portion; a valve assembly fastened to said neck portion and including a housing member having a longitudinal passageway therethrough; an axially movable valve stem member in said passageway, said valve member and said passageway having different diameters adjacent to their lower ends to form a measuring chamber, and having other different diameters intermediate their ends to form a transfer chamber, said valve stem member having passage means therein adapted to communicate between said transfer chamber and the exterior of said container; a first annular, downwardly directed, cup-shaped sealing element on one of said members and adapted to form a first fluid seal between said members at the upper end of said transfer chamber; a second annular, downwardly directed, cup-shaped sealing element on one of said members and adapted to form a second fluid seal between said members between said chambers; and a third annular, downwardly directed, cup-shaped sealing element on one of said members and adapted to form a fluid seal between said members at the lower end of said measuring chamber.

References Cited by the Examiner
UNITED STATES PATENTS

| | | |
|---|---|---|
| 2,744,665 | 5/56 | Carlson et al. |
| 2,775,483 | 12/56 | Treharne et al. |
| 2,812,884 | 11/57 | Ward. |
| 2,856,103 | 10/58 | Ward. |
| 2,858,053 | 10/58 | Waldherr. |
| 2,931,540 | 4/60 | Meshberg _____ 239—573 X |
| 2,968,427 | 1/61 | Meshberg. |
| 2,973,123 | 2/61 | Rousset _____ 239—350 X |
| 3,019,947 | 2/62 | Gorman _____ 239—350 X |
| 3,064,865 | 11/62 | Scoggin et al. _____ 239—573 X |

RAPHAEL M. LUPO, *Primary Examiner.*